United States Patent
Jade et al.

(10) Patent No.: US 10,202,927 B2
(45) Date of Patent: Feb. 12, 2019

(54) FUELING STRATEGY FOR CONTROLLED-AUTOIGNITION ENGINES

(71) Applicant: Robert Bosch GmbH, Stuttgart (DE)

(72) Inventors: Shyam Jade, Ann Arbor, MI (US); Erik Hellstrom, Ann Arbor, MI (US); Anna Stefanopoulou, Ann Arbor, MI (US); Li Jiang, Ann Arbor, MI (US)

(73) Assignees: Robert Bosch GmbH, Stuttgart (DE); The Regents of the University of Michigan, Ann Arbor, MI (US)

( * ) Notice: Subject to any disclaimer, the term of this patent is extended or adjusted under 35 U.S.C. 154(b) by 1598 days.

(21) Appl. No.: 13/621,433

(22) Filed: Sep. 17, 2012

(65) Prior Publication Data

US 2013/0090838 A1 Apr. 11, 2013

Related U.S. Application Data

(60) Provisional application No. 61/543,544, filed on Oct. 5, 2011.

(51) Int. Cl.
*F02D 41/24* (2006.01)
*F02D 41/30* (2006.01)
(Continued)

(52) U.S. Cl.
CPC ....... *F02D 41/2451* (2013.01); *F02D 35/023* (2013.01); *F02D 35/028* (2013.01);
(Continued)

(58) Field of Classification Search
CPC ............... F02D 41/3035; F02D 35/023; F02D 2041/001; F02D 35/028; F02D 13/0219;
(Continued)

(56) References Cited

U.S. PATENT DOCUMENTS 5,094,213 A 3/1992 Dudek et al.
6,082,342 A 7/2000 Duret et al.
(Continued)

FOREIGN PATENT DOCUMENTS

JP 2008291718 12/2008

OTHER PUBLICATIONS

Ravi et al., "Mid-ranging control of a multi-cylinder HCCI engine using split fuel injection and valve timings," Sixth IFAC Symposium on Advances in Automotive Control, 2010.
(Continued)

*Primary Examiner* — Sizo Vilakazi
(74) *Attorney, Agent, or Firm* — Michael Best & Friedrich LLP

(57) ABSTRACT

Methods and systems for controlling combustion performance of an engine during recompression HCCI combustion are provided. The method includes regulating a valve actuation timing and a fuel injection timing to cause a combustion phasing of at least one cylinder of the engine to approach a target combustion phasing, and estimating current combustion state information based on the combustion phasing. The current combustion state information includes at least one of a temperature, a pressure, and a pre-combustion charge composition associated with the at least one cylinder. The method further includes determining a target fuel injection amount, and determining whether the target fuel injection amount would require actuator settings that violate predetermined constraints in order to cause the combustion phasing to approach the target combustion phasing. A fuel injection amount is adjusted when the target fuel injection amount would require actuator settings that violate the predetermined constraints.

13 Claims, 6 Drawing Sheets

(51) Int. Cl.
*F02D 41/40* (2006.01)
*F02D 35/02* (2006.01)
*F02D 41/14* (2006.01)

(52) U.S. Cl.
CPC ......... *F02D 41/3035* (2013.01); *F02D 41/40* (2013.01); *F02D 41/2464* (2013.01); *F02D 2041/141* (2013.01); *F02D 2041/1412* (2013.01); *F02D 2041/1416* (2013.01); *Y02T 10/128* (2013.01); *Y02T 10/44* (2013.01)

(58) Field of Classification Search
CPC ............. F02D 13/0207; F02D 41/0052; Y02T 10/128; Y02T 10/44; F02B 1/12
USPC ....... 701/102, 103, 104, 105, 107, 108, 109, 701/110, 111, 113, 114
See application file for complete search history.

(56) References Cited

U.S. PATENT DOCUMENTS

| | | | |
|---|---|---|---|
| 6,230,683 B1 | 5/2001 | zur Loye et al. | |
| 6,276,334 B1 | 8/2001 | Flynn et al. | |
| 6,480,782 B2 | 11/2002 | Brackney et al. | |
| 6,953,024 B2 | 10/2005 | Linna et al. | |
| 6,994,072 B2 | 2/2006 | Kuo et al. | |
| 7,072,758 B2 | 7/2006 | Kolmanovsky et al. | |
| 7,128,047 B2 | 10/2006 | Kuo et al. | |
| 7,228,839 B2 | 6/2007 | Kuo et al. | |
| 7,275,374 B2 | 10/2007 | Stewart et al. | |
| 7,337,762 B2 | 3/2008 | Eng et al. | |
| 7,739,999 B2 | 6/2010 | Kang et al. | |
| 7,878,048 B2 | 2/2011 | Wang et al. | |
| 7,899,601 B2 | 3/2011 | Yun et al. | |
| 8,061,318 B2 | 11/2011 | Cleary et al. | |
| 8,103,425 B2 | 1/2012 | Choi et al. | |
| 8,437,945 B2 | 5/2013 | Haskara et al. | |
| 2006/0112680 A1 | 6/2006 | Beer et al. | |
| 2006/0196468 A1 | 9/2006 | Chang et al. | |
| 2007/0119417 A1* | 5/2007 | Eng | F01L 1/34 123/305 |
| 2007/0162216 A1 | 7/2007 | Choi et al. | |
| 2007/0215095 A1* | 9/2007 | Kakuya | F02D 37/02 123/295 |
| 2007/0272203 A1 | 11/2007 | Sloane et al. | |
| 2009/0101094 A1 | 4/2009 | Mashiki et al. | |
| 2009/0254263 A1* | 10/2009 | Shimizu | F01L 13/0021 701/104 |
| 2010/0031924 A1 | 2/2010 | Sun et al. | |
| 2011/0005491 A1* | 1/2011 | Terada | F02D 35/026 123/299 |
| 2011/0016850 A1 | 1/2011 | Shibata et al. | |
| 2011/0137541 A1 | 6/2011 | Malikopoulos | |

OTHER PUBLICATIONS

Allison et al., "Design and performance of mid-ranging controllers," Journal of Process Control, vol. 8, Nos. 5-6, pp. 469-474, Dec. 1998.
Vahidi et al., "Constraint handling in a fuel cell system: a fast reference governor approach," Proceedings of the 2005 American Control Conference, vol. 6, pp. 3865-3870, 2005.
Jade et al., "Fuel governor augmented control of recompression HCCI combustion during large load transients," Submitted to 2012 American Control Conference, Jun. 27-29, Montreal, Canada.
Jade et al., "Fuel governor augmented control of recompression HCCI combustion during large load transients," Preprint submitted to 2012 American Control Conference, Received Sep. 25, 2011.
U.S. Appl. No. 13/621,539, filed Sep. 17, 2012.
U.S. Appl. No. 13/621,527, filed Sep. 17, 2012.
U.S. Appl. No. 13/621,425, filed Sep. 17, 2012.
U.S. Appl. No. 13/621,425 dated Aug. 28, 2015 (11 pages).

* cited by examiner

FUELING STRATEGY FOR CONTROLLED-AUTOIGNITION ENGINES

CROSS-REFERENCE TO RELATED APPLICATIONS

This application claims priority to U.S. Provisional Application No. 61/543,544, filed Oct. 5, 2011, and titled "FUELING STRATEGY FOR CONTROLLED-AUTOIGNITION ENGINES," the entirety of which is incorporated herein by reference.

STATEMENT REGARDING FEDERALLY SPONSORED RESEARCH OR DEVELOPMENT

This invention was made with Government support under grant No. DE-EE0003533 awarded by the Department of Energy. The Government has certain rights in this invention.

BACKGROUND

Embodiments of the present invention relate to real-time engine control during recompression homogeneous charge compression ignition ("HCCI") combustion.

SUMMARY

In one embodiment, the invention provides a method for controlling combustion performance of an engine during recompression HCCI combustion. The method includes regulating a valve actuation timing and a fuel injection timing to cause a combustion phasing of at least one cylinder of the engine to approach a target combustion phasing, and estimating current combustion state information based, at least in part, on the combustion phasing of the at least one cylinder. The current combustion state information includes at least one of a temperature associated with the at least one cylinder, a pressure associated with the at least one cylinder, and a pre-combustion charge composition associated with the at least one cylinder. The method further includes determining a target fuel injection amount based on a commanded torque, and determining whether the target fuel injection amount would require actuator settings that violate predetermined constraints in order to cause the combustion phasing of the at least one cylinder of the engine to approach the target combustion phasing. A fuel injection amount is adjusted when the target fuel injection amount would require actuator settings that violate the predetermined constraints.

In some embodiments, the act of determining whether the target fuel injection amount would require actuator settings that violate predetermined constraints includes determining a maximum fuel injection amount and a minimum fuel injection amount based on the estimated current combustion state information. The fuel injection amount is adjusted to equal the maximum fuel injection amount when the target fuel injection amount exceeds the maximum fuel injection amount. Furthermore, the fuel injection amount is adjusted to equal the minimum fuel injection amount when the target fuel injection amount is less than the minimum fuel injection amount. In some embodiments, the adjusted fuel injection amount is injected when the target fuel injection amount would require actuator settings that violate the predetermined constraints. Additionally, the target fuel injection amount is injected when the target fuel injection amount would require actuator settings that satisfy the predetermined constraints.

In some embodiments, the method further includes regulating the injected fuel amount to cause both the combustion phasing of the at least one cylinder of the engine to approach the target combustion phasing and the injected fuel amount to approach the target fuel injection amount. Additionally, in some embodiments, the injected fuel amount is regulated with a closed-loop fuel governor independent of the valve actuation timing and the fuel injection timing. In some embodiments, the valve actuation timing and the fuel injection timing are simultaneously regulated with a closed-loop combustion phasing controller.

In some embodiments, the predetermined constraints include at least one of actuator component constraints (i.e., range and rate limitations), actuator control authority constraints (i.e., a relative magnitude of authority and a bandwidth), and combustion performance constraints (i.e., limited pressure rise rates, air-to-fuel ratios, and maximum allowable emissions).

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Internal combustion engines can be configured to operate in one or more of various combustion modes—the most well known of which is spark ignition. However, some engines are configured to operate in autoignition mode where combustion is achieved by compressing the in-cylinder gas to the point of selfignition instead of introducing a spark. In the examples described below, the internal combustion engine can selectively switch between a spark ignition mode and an autoignition (or homogeneous charge compression ignition (HCCI)) mode. In other examples, an internal combustion engine can be configured to operate in additional or other combustion modes.

Figure 1:
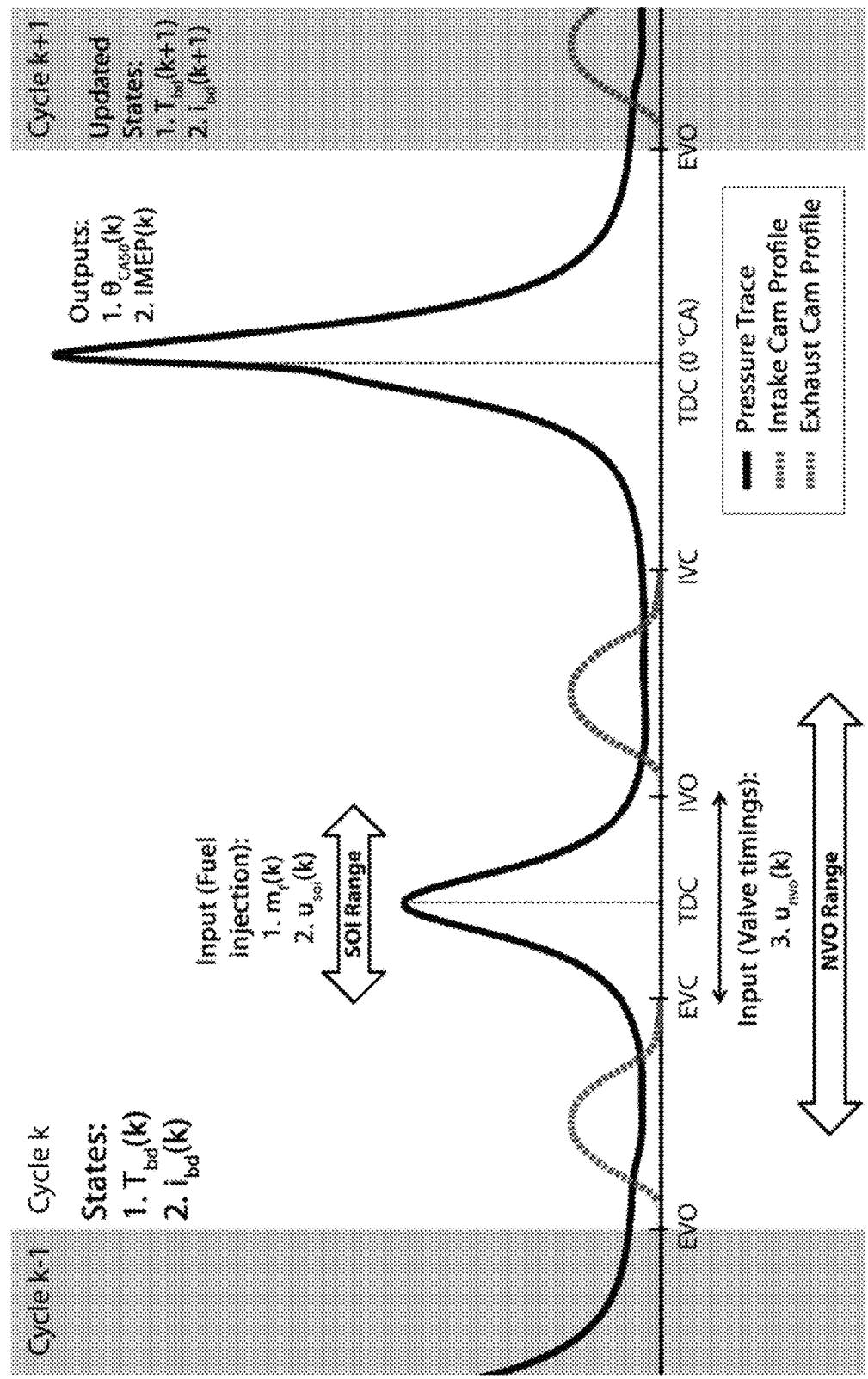
FIG. 1 is a graph illustrating recompression HCCI combustion for an internal combustion engine as a function of time.

FIG. 1 illustrates the operation of a single cylinder of an internal combustion engine during autoignition combustion (otherwise known as homogeneous charge compression ignition). The solid black line represents the pressure inside the engine cylinder. The position of the exhaust valve is indicated by the dotted line extending from EVO ("exhaust valve opening") to EVC ("exhaust valve closing"). Similarly, the position of the intake valve is indicated by the dotted line extending from IVO ("intake valve opening") to IVC ("intake valve closing"). The valve timing (i.e., the opening and closing times of the intake and exhaust valves) is configured to achieve a negative valve overlap (NVO) which traps large amounts of hot residual gas and, ultimately, helps cause combustion within the cylinder. FIG. 1 illustrates one complete combustion cycle for the cylinder (Cycle k). FIG. 1 also illustrates part of the previous combustion cycle (Cycle k−1) and the subsequent combustion cycle (Cycle k+1).

As illustrated in FIG. 1, fuel is injected into the cylinder during the negative valve overlap range (i.e., after the exhaust valve closes, but before the intake valve opens). The pressure inside the cylinder also increases during the negative valve overlap range (i.e., the first area of increased pressure illustrated in FIG. 1). After the intake valve is closed, but before the exhaust valve is opened, the pressure in the cylinder again increases. When the pressure and heat in the cylinder are sufficient the fuel-air mixture in the cylinder ignites, further increasing the pressure within the cylinder and forcing the piston downwards. As the gas expands, the piston moves downwards, and the exhaust valve is opened (EVO) to begin the next combustion cycle.

Figure 2:
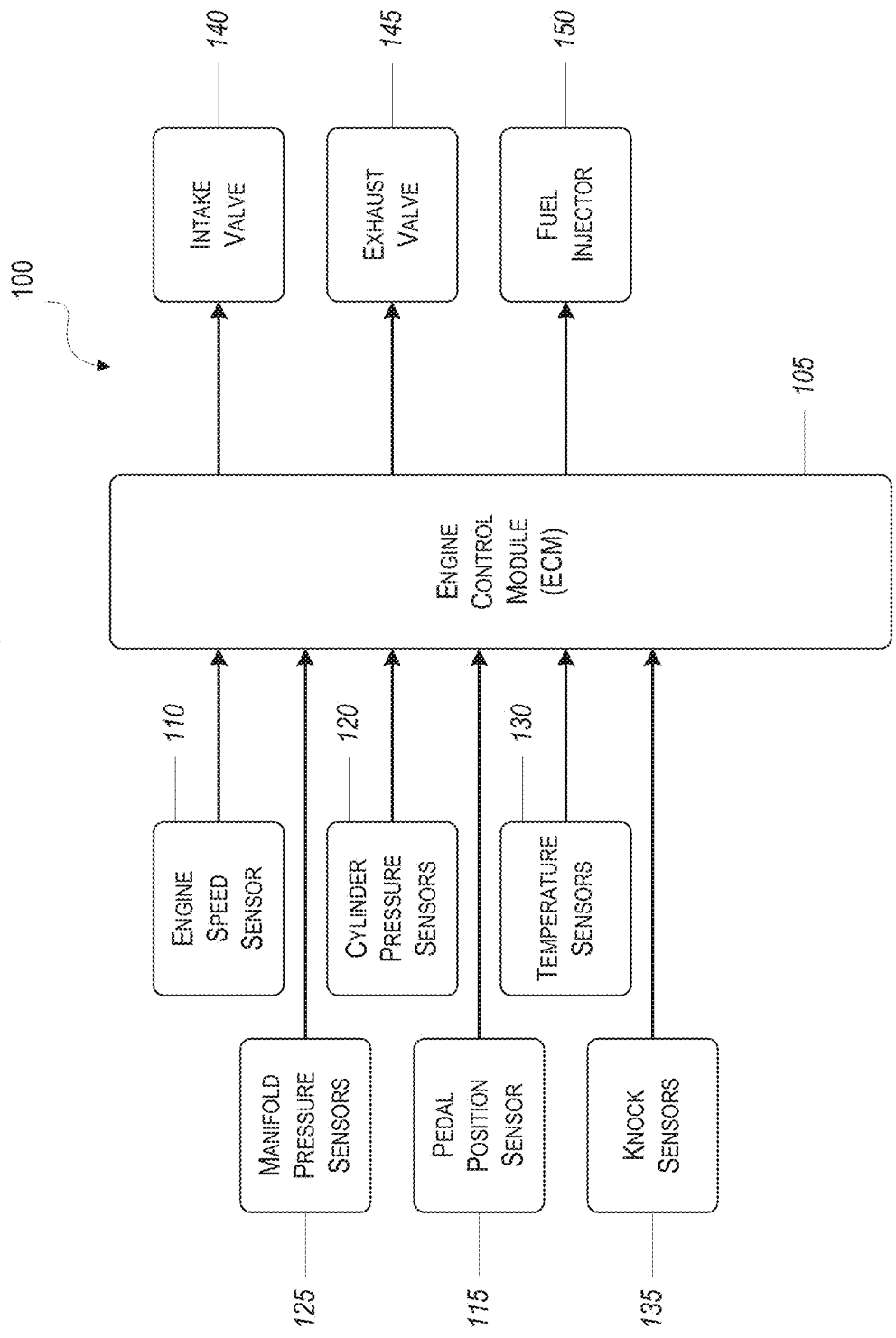
FIG. 2 is a block diagram of a HCCI engine control system.

FIG. 2 illustrates a real-time engine control system 100 that, among other things, monitors and controls the operation of an internal combustion engine during recompression homogeneous charge compression ignition ("HCCI") combustion. The engine control system 100 includes an engine control module 105 implemented on a vehicle equipped with a plurality of engine sensors and engine control actuators. The sensors include, for example, an engine speed sensor 110, a pedal position sensor 115, cylinder pressure sensors 120, manifold pressure sensors 125 (i.e., intake manifold, temperature or pressure), temperature sensors 130 (i.e., cooling temperature sensor), knock sensors 135, and other engine sensors. The actuators include, for example, the intake valve 140, the exhaust valve 145, and the fuel injector 150. The fuel injector 150 injects fuel into a cylinder of the internal combustion engine of the vehicle according to an injection timing value (e.g., start of fuel injection ($u_{soi}$)) and an injection quantity value (e.g., fuel injection amount ($m_f$)) determined by the engine control module as described in further detail below.

The ECM 105 monitors the various sensors 110, 115, 120, 125, 130, 135 and controls the actuators 140, 145, 150. The ECM 105 receives information (i.e., data captured by the sensors) and processes the received information to control the combustion performance of the engine such that a target combustion phasing ($\theta_{CA50}{}^{ref}(k)$) and a target fuel injection amount ($m_f^{des}(k)$) are achieved, and predetermined constraint requirements are satisfied. The ECM 105 includes at least one processor and at least one memory module 155, shown in FIG. 3. The memory module 155 stores data (e.g., target values of combustion phasing ($\theta_{CA50}{}^{ref}(k)$) and fuel injection timing ($u_{soi}{}^{ref}(k)$)) and instructions that are executed by the processor to provide the functionality of the ECM 105.

Figure 3:
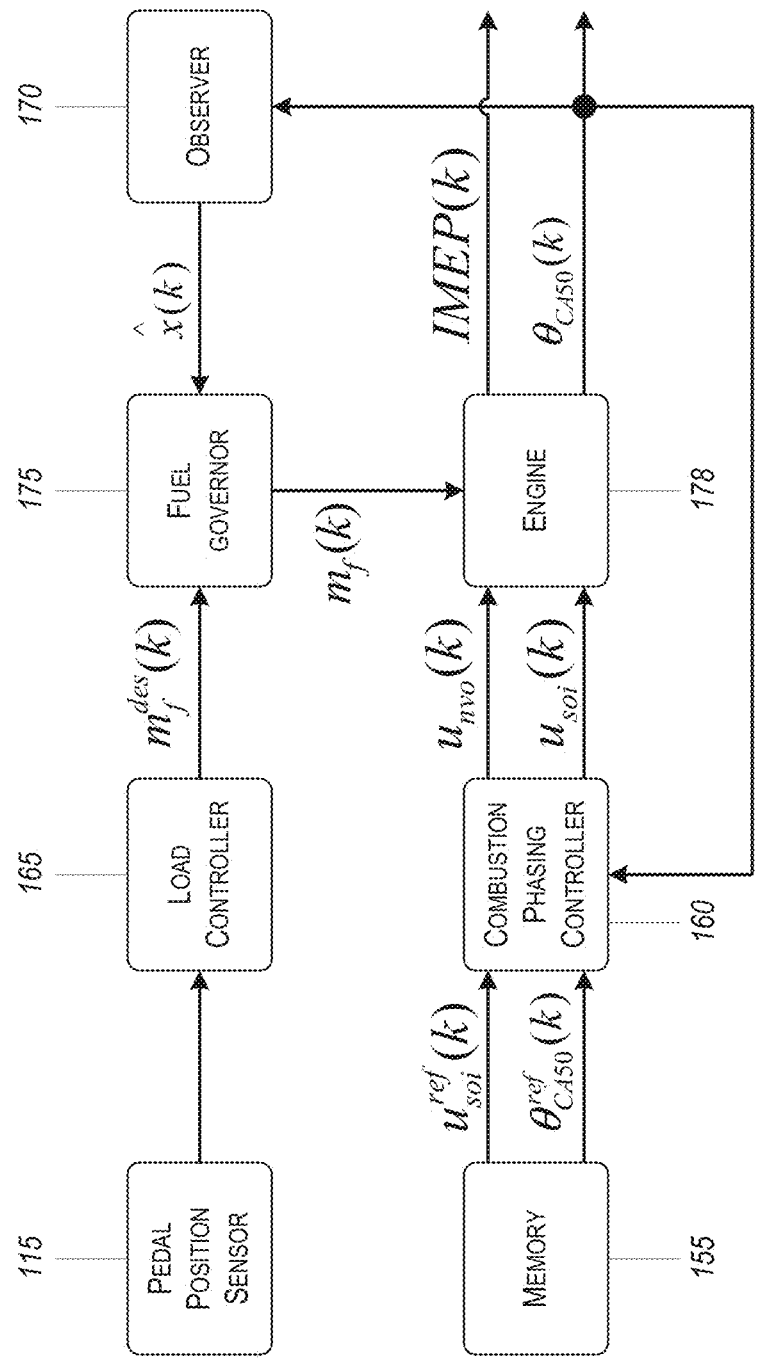
FIG. 3 is a schematic flowchart illustrating the flow of information during the operation of the HCCI engine control system of FIG. 2.

FIG. 3 illustrates the operation of a real-time HCCI engine control system 100 such as the one illustrated in FIG. 2. The HCCI engine control system of FIG. 3 includes the memory module 155, the combustion phasing controller 160, the load controller 165, the observer 170, the fuel governor 175, and the pedal position sensor 115 of the engine 178 equipped with the various sensors and actuators as described above in reference to FIG. 2. The combustion phasing controller 160 receives and processes the target values of combustion phasing ($\theta_{CA50}{}^{ref}(k)$) and fuel injection timing ($u_{soi}{}^{ref}(k)$) stored in the memory module 155. The combustion phasing controller 160 also receives a combustion phasing ($\theta_{CA50}(k)$) value based on information received from the engine sensors. Based on the received values, the combustion phasing controller 160 regulates actuator settings to cause the combustion phasing ($\theta_{CA50}(k)$) to approach the target combustion phasing ($\theta_{CA50}{}^{ref}(k)$). The actuator settings ($u(k)$) include valve actuation timing ($u_{nvo}(k)$) and fuel injection timing ($u_{soi}(k)$), thus $$u = [u_{nvo}, u_{soi}]^T \tag{1}$$

where k is the current combustion cycle.

The observer 170 receives and processes the combustion phasing ($\theta_{CA50}(k)$) of the engine 178 to estimate current combustion state information. The current combustion state information, denoted by ($\hat{x}(k)$), includes a temperature ($T_{bd}(k)$) and a pre-combustion charge composition ($i_{bd}(k)$) associated with at least one cylinder of the engine 178.

$$x_d [i_{bd}, T_{bd}]^T \tag{2}$$

An output from the pedal position sensor 115 is received and processed by the load controller 165 to determine a target fuel injection amount. In some constructions, this is accomplished by employing a torque correlation model to determine an amount of torque to be exercised based, at least in part, on the pedal position measurements. After applying the torque correlation model, the load controller 165 uses a converter to determine the target fuel injection amount ($m_f^{des}(k)$) based on the determined amount of torque.

The estimated current combustion state information ($\hat{x}(k)$) and the determined target fuel injection amount ($m_f^{des}(k)$) are received and processed by the fuel governor 175 to determine an appropriate amount of fuel to inject ($m_f(k)$) into at least one cylinder of the engine 178. The fuel governor 175 employs a predictive model, described in further detail below, to determine whether the target fuel injection amount ($m_f^{des}(k)$) would require actuator settings ($u(k)$) that violate predetermined constraints in order to cause the combustion phasing ($\theta_{CA50}(k)$) of the engine 178 to approach the target combustion phasing ($\theta_{CA50}{}^{ref}(k)$). If the target fuel injection amount ($m_f^{des}(k)$) would require actuator settings ($u(k)$) that violate predetermined constraints, the fuel governor 175 adjusts the fuel injection amount ($m_f(k)$), as discussed in more detail below in reference to FIGS. 5 and 6. The adjusted fuel injection amount ($m_f(k)$) is then used as an input to the fuel injector of the engine 178. If the fuel governor 175 predicts that the target fuel injection amount ($m_f^{des}(k)$) would require actuator settings ($u(k)$) that satisfy the predetermined constraints, the target fuel injection amount ($m_f^{des}(k)$) is provided to the fuel injector and injected to the engine cylinder. Under these conditions, the engine is capable of delivering the requested torque while also causing the combustion phasing of the engine to approach the target combustion phasing.

The predetermined constraints, mentioned in the paragraphs above in reference to FIGS. 1-3, may include actuator component constraints, actuator control authority constraints, and combustion performance constraints. In some embodiments, the actuator component constraints may include range and rate limitations for each of the plurality of actuators controlling the valve actuation timing and the fuel injection timing. The valve actuation timing, denoted by $u_{nvo}(k)$, is limited within a range of values and defined by $$u_{nvo}^{min} \leq u_{nvo} \leq u_{nvo}^{max} \quad (3)$$

where $u_{nvo}^{min}$ is the minimum valve actuation timing and $u_{nvo}^{max}$ is the maximum valve actuation timing. The maximum rate for valve actuation timing, denoted by $\Delta u_{nvo}$, is given by $$|u_{nvo}(k)-u_{nvo}(k-1)|<\Delta u_{nvo} \quad (4)$$

where $u_{nvo}(k)$ is the current value of the valve actuation timing and $u_{nvo}(k-1)$ is the previous value of the valve actuation timing. The fuel injection timing, denoted by $u_{soi}(k)$, is also limited within a range of values and defined by $$u_{soi}^{min} \leq u_{soi} \leq u_{soi}^{max} \quad (5)$$

where $u_{soi}^{min}$ is the minimum fuel injection timing and $u_{soi}^{max}$ is the maximum fuel injection timing. The values of minimum and maximum timing and the maximum rate thresholds are constants, which are hardware dependent. Examples of range limitations for actuators controlling valve timing (defining the negative valve overlap period) and the fuel injection timing (defined by the start of injection ("SOI")) and how they correspond to the overall timing of the combustion cycle are partially illustrated in FIG. 1.

Aside from the actuator component constraints, the predetermined constraints may also include the actuator control authority constraints and the combustion performance constraints. In some embodiments, the actuator control authority constraints include a relative magnitude of authority and a bandwidth for each of the plurality of actuators controlling the valve actuation timing ($u_{nvo}(k)$) and the fuel injection timing ($u_{soi}(k)$). Additionally, in some embodiments, the combustion performance constraints include limited pressure rise rates, air-to-fuel ratios, and maximum allowable emissions.

Figure 4:
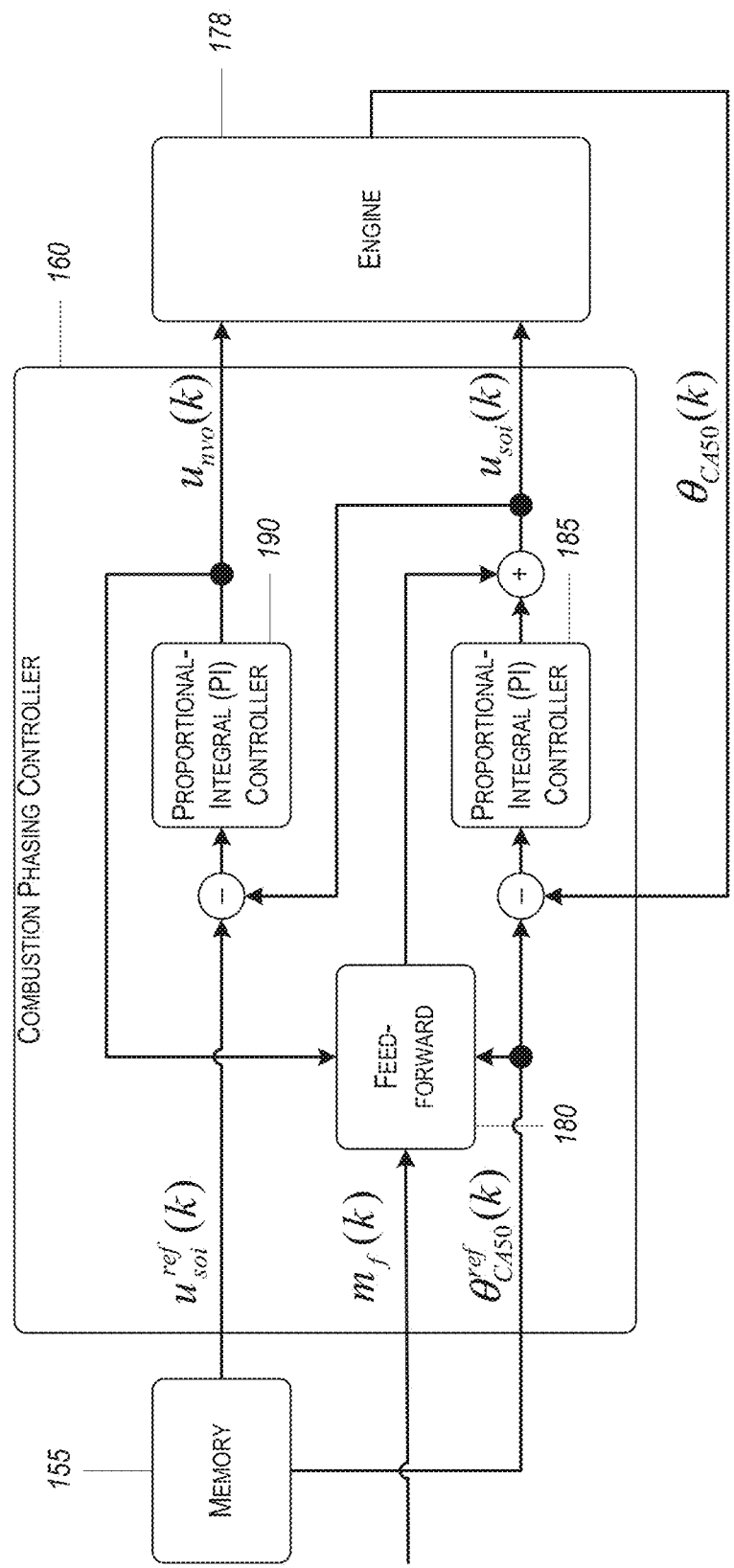
FIG. 4 is a schematic flowchart illustrating the operation of the combustion phasing controller of FIG. 3 in further detail.

FIG. 4 illustrates one implementation of the combustion phasing controller 160 of FIG. 3 including a feed-forward module 180, a proportional-integral ("PI") controller 185, and a second PI controller 190. The combustion phasing controller 160 is configured to receive and process the target values of combustion phasing ($\theta CA50^{ref}(k)$) and fuel injection timing ($u_{soi}^{ref}(k)$), the fuel injection amount ($m_f(k)$), and the combustion phasing ($\theta_{CA50}(k)$) output of the engine 178. The combustion phasing ($\theta_{CA50}(k)$) is defined by $$\theta_{CA50}(k)=g(x_d(k),u(k),m_f(k),x_c(kT_s)) \quad (6)$$

where $x_d(k)$ is the discrete combustion state vector, $u(k)$ is the vector of actuator settings, $m_f(k)$ is the fuel injection amount, $x_c$ is a vector of five continuous manifold states, and $T_s$ is the engine cycle time. Based on the received input values, the combustion phasing controller 160 simultaneously regulates the exhaust valve closing ("EVC") and the fuel injection timing ($u_{soi}(k)$) to control the engine 178 during recompression HCCI combustion such that target combustion phasing ($\theta_{CA50}^{ref}(k)$) is achieved.

Figure 5:
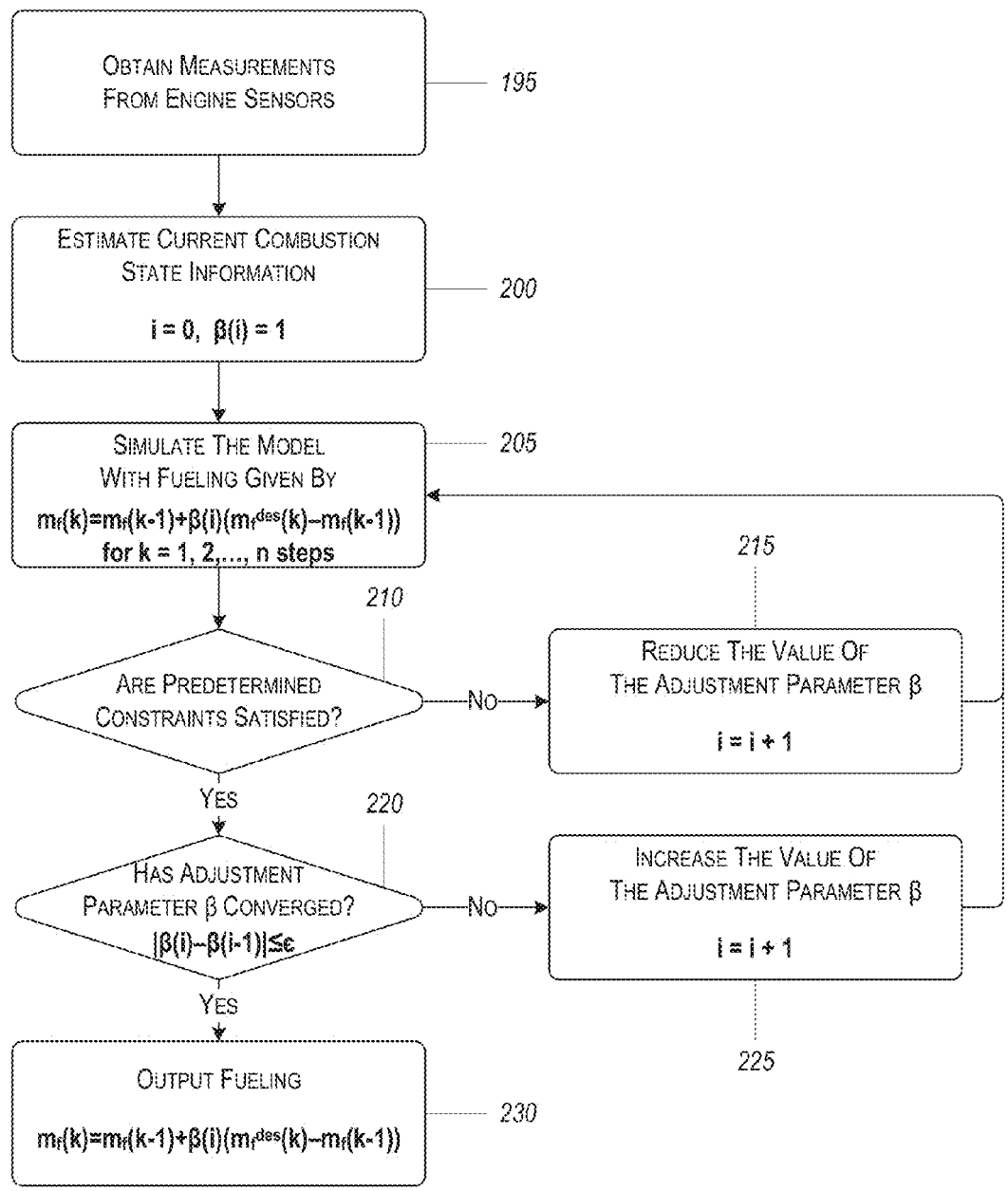
FIG. 5 is a flowchart of a nonlinear method of operating the fuel governor of FIG. 3 to determine a fuel injection amount for an internal combustion engine.

FIG. 5 illustrates a nonlinear approach by which the fuel governor 175 controls the amount of fuel injected ($m_f(k)$) into at least one cylinder of the engine 178. The objective of this nonlinear approach is to inject fuel into a cylinder of the engine 178 while simultaneously allowing the combustion phasing controller 160 to achieve the target combustion phasing ($\theta_{CA50}^{ref}(k)$) without violating predetermined constraints as discussed above. When implementing the nonlinear fuel governor of FIG. 5, the ECM 105 receives engine data (i.e., engine speed, cylinder pressures, temperatures, pedal position, and other) captured by the sensors and measurements of the combustion phasing ($\theta_{CA50}(k)$) and indicated mean effective pressure (IMEP) (step 195). The ECM 105 processes the received data and measurements, and determines a target fuel injection amount ($m_f^{des}(k)$) and current combustion state information ($\hat{x}(k)$) for a first combustion cycle (step 200). The ECM 105 then estimates the actuator settings required during a subsequent combustion cycle to approach the target combustion phasing ($\theta_{CA50}^{ref}(k)$) if the target fuel injection amount ($m_f^{des}$) were to be injected during the first combustion cycle (step 205). The nonlinear fuel governor employs a simulated model of the closed loop engine system 100 with the amount of fuel injected ($m_f(k)$) given by $$m_f(k)=m_f(k-1)+\beta(m_f^{des}(k)-m_f(k-1)) \quad (7)$$

where $m_f^{des}(k)$ is the target fuel injection amount for the first combustion cycle, $m_f(k-1)$ is the amount of fuel injected during a previous combustion cycle, and $\beta$ is the adjustment parameter used in determining an attenuated fuel quantity ($m_f(k)$). The value of $\beta$ is initially set to 1 ("one").

If the actuator settings required during the subsequent combustion cycle to approach the target combustion phasing ($\theta_{CA50}^{ref}(k)$) are predicted to violate the predetermined constraints if the target fuel injection amount ($m_f^{des}(k)$) is injected during the first combustion cycle (step 210), then the attenuated fuel quantity ($m_f(k)$) is determined (steps 205-225) and injected during the first combustion cycle (step 230). If the actuator settings required during the subsequent combustion cycle to approach the target combustion phasing ($\theta_{CA50}^{ref}(k)$) are predicted to satisfy the predetermined constraints if the target fuel injection amount ($m_f^{des}(k)$) is injected during the first combustion cycle (step 210), then the target fuel injection amount ($m_f^{des}(k)$) is injected during the first combustion cycle (step 230).

If constraint violations are predicted (step 210), the ECM 105 reduces the value of the adjustment parameter ($\beta$) (step 215). Then, the ECM 105 determines a first adjusted fuel quantity based on the reduced adjustment parameter ($\beta$), the target fuel injection amount ($m_f^{des}(k)$), and the amount of fuel injected during the previous combustion cycle ($m_f(k-1)$), if such amount is known (step 205). The ECM 105 utilizes the predictive model of the nonlinear fuel governor to again determine the actuator settings required during the subsequent combustion cycle to approach the target combustion phasing ($\theta_{CA50}^{ref}(k)$) if the first adjusted fuel quantity is injected during the first combustion cycle (step 205). If the actuator settings required during the subsequent combustion cycle to approach the target combustion phasing ($\theta_{CA50}^{ref}(k)$) are still predicted to violate the predetermined actuator constraints if the first adjusted fuel quantity is injected during the first combustion cycle (step 210), then the adjustment parameter ($\beta$) is again reduced (step 215) and a second adjusted fuel quantity is determined based upon the reduced adjustment parameter ($\beta$) (step 205). This process is repeated until an adjusted fuel quantity is calculated that does not require a violation of the actuator constraints.

Once an adjusted fuel quantity is determined that satisfies the actuator constraint (step 210), the ECM 105 determines whether the value of the adjustment parameter ($\beta$) has converged toward an optimal value of $\beta$ between zero and one (step 220) as it was adjusted. If the adjustment parameter ($\beta$) has not converged (step 220), the ECM 105 increases the value of the adjustment parameter ($\beta$) (step 225) and again simulates the model to determine an adjusted fuel quantity (step 205). The adjustment parameter ($\beta$) has converged when a difference between a current value of the adjustment parameter β(i) and a value of the adjustment parameter calculated during a previous iteration of the predictive model β(i−1) is less than a predetermined tolerance (ε).

$$|\beta(i)-\beta(i-1)|\le\epsilon \quad (8)$$

Otherwise, the adjustment parameter (β) has not converged.

This process is repeated until the value of the adjustment parameter converges toward an optimal value which can be used to calculate a fuel injection quantity that does not lead to violations of the actuator constraints. In some embodiments, the repeated acts of reducing and increasing the value of the adjustment parameter (β) are performed according to a bisectional search between the values of zero and one.

Figure 6:
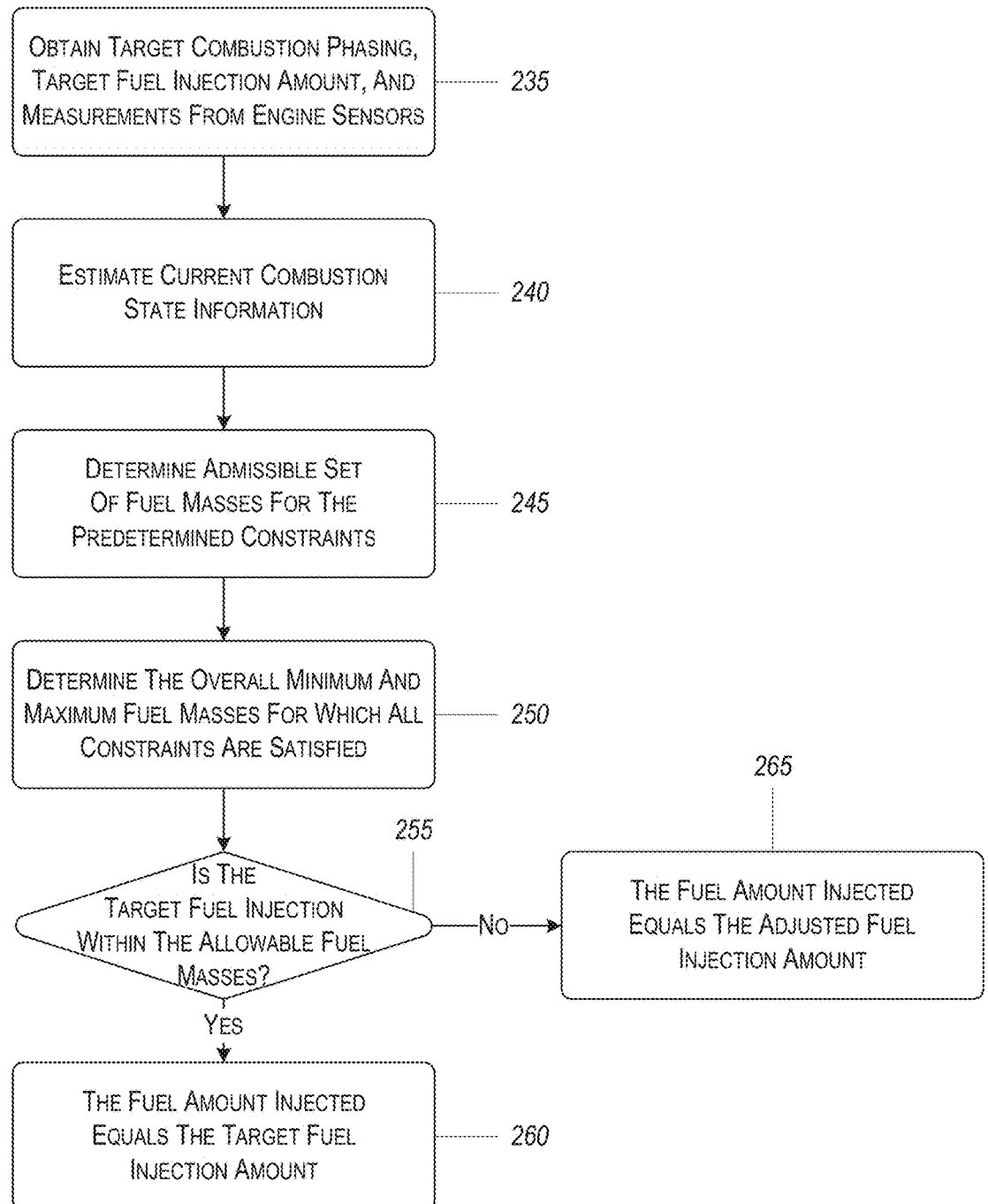
FIG. 6 is a flowchart of a linear method of operating the fuel governor of FIG. 3 to determine a fuel injection amount for an internal combustion engine.

FIG. 6 illustrates the operation of another example of a fuel governor 175. This example uses a linear method for determining if desired fuel injection amounts would violate the engine actuator constraints. When implemented as a linear system, the ECM 105 again receives and processes the engine data captured by the sensors, the engine output corresponding to the combustion phasing ($\theta_{CA50}(k)$), and the target values of combustion phasing ($\theta_{CA50}^{ref}(k)$) and fuel injection amount ($m_f^{des}(k)$) (step 235). The ECM 105 then uses the functionality of the observer 170 to estimate the current combustion state information ($\hat{x}(k)$) (step 240). Based on the estimated current combustion state information ($\hat{x}(k)$), the ECM 105 determines a range of permissible fuel amounts for each of the plurality of predetermined constraints to be satisfied (step 245).

For example, the range of permissible fuel amounts for an NVO saturation constraint, denoted by $S_{nvo}^{sat}(n)$, is given by $$S_{nvo}^{sat}(n)=[m_f^{min}(n),m_f^{max}(n)] \quad (9)$$

where $m_f^{min}(n)$ is the minimum fuel amount and $m_f^{max}(n)$ is the maximum fuel amount permissible for the NVO saturation constraint to be satisfied. An overall minimum fuel amount ($m_f^{min}$) and an overall maximum fuel amount ($m_f^{max}$) are determined (step 250) and defined by $$[m_f^{min},m_f^{max}]=\overline{S_{nvo}^{sat}}\cap\overline{S_{nvo}^{rate}}\cap\overline{S_{soi}^{sat}} \quad (10)$$

the overlap between the range of permissible fuel amounts for the NVO saturation constraint ($S_{nvo}^{sat}(n)$), the range of permissible fuel amounts for an NVO rate constraint ($S_{nvo}^{rate}(n)$), and the range of permissible fuel amounts for an SOI saturation constraint ($S_{soi}^{sat}(n)$) for which all constraints will be satisfied.

As further illustrated in FIG. 6, if the target fuel injection amount ($m_f^{des}(k)$) is within the range defined by the overall minimum fuel amount ($m_f^{min}$) and the overall maximum fuel amount ($m_f^{max}$) (step 255), then the amount of fuel injected ($m_f(k)$) into at least one cylinder of the engine 178 equals the target fuel injection amount ($m_f^{des}(k)$) (step 260). If, however, the ECM 105 determines that the target fuel injection amount ($m_f^{des}(k)$) falls outside of the range of allowable fuel amounts (step 255), then the amount of fuel is adjusted before it is injected (step 265). The amount of fuel injected, denoted by ($m_f(k)$), is defined by $$m_f(k) = \begin{cases} m_f^{min} & \text{if } m_f^{des}(k) < m_f^{min} \\ m_f^{max} & \text{if } m_f^{des}(k) > m_f^{max} \\ m_f^{des}(k) & \text{otherwise} \end{cases} \quad (11)$$

where $m_f^{min}$ is the overall minimum fuel amount, $m_f^{max}$ is the overall maximum fuel amount, and $m_f^{des}(k)$ is the target fuel injection amount. As such, the amount of fuel to be injected ($m_f(k)$) is adjusted to equal the overall maximum fuel amount ($m_f^{max}$) when the target fuel injection amount $m_f^{des}(k)$ exceeds the overall maximum fuel injection amount ($m_f^{max}$). Conversely, the amount of fuel to be injected ($m_f(k)$) is adjusted to equal the overall minimum fuel amount ($m_f^{min}$) when the target fuel injection amount $m_f^{des}(k)$ is below the overall minimum fuel amount ($m_f^{min}$).

Thus, embodiments of the invention provide, among other things, methods and systems for controlling the performance of the engine during recompression HCCI combustion by adjusting the fuel amount injected into the engine when the fuel governor predicts that the target fuel injection amount would require actuator settings that violate the predetermined constraints.

Various features of the invention are set forth in the following claims.

What is claimed is:

1. A method for controlling combustion performance of an engine during recompression homogeneous charge compression ignition ("HCCI"), the method comprising:
regulating a valve actuation timing and a fuel injection timing to cause a combustion phasing of at least one cylinder of the engine to approach a target combustion phasing;
estimating current combustion state information based, at least in part, on the combustion phasing of the at least one cylinder, the current combustion state information including at least one of a temperature associated with the at least one cylinder, a pressure associated with the at least one cylinder, and a pre-combustion charge composition associated with the at least one cylinder;
determining a target fuel injection amount;
determining, based on the estimated current combustion state information, whether the actuator settings required to cause the combustion phasing of the at least one cylinder of the engine to approach the target combustion phasing would violate predetermined constraints if the target fuel injection amount is injected, wherein the actuator settings required to cause the combustion phasing of the at least one cylinder of the engine to approach the target combustion phasing includes an adjustment to the valve actuation timing and an adjustment of the fuel injection timing; and
determining an adjusted fuel injection amount when the target fuel injection amount would require actuator settings that violate the predetermined constraints.

2. The method of claim 1, wherein determining whether the required require actuator settings would violate the predetermined constraints includes determining a maximum fuel injection amount and a minimum fuel injection amount based on the estimated current combustion state information that would not require actuator settings that violate the predetermined constraints.

3. The method of claim 2, wherein determining the adjusted fuel injection amount includes adjusting the fuel injection amount to equal the maximum fuel injection amount when the target fuel injection amount exceeds the maximum fuel injection amount.

4. The method of claim 2, wherein determining the adjusted fuel injection amount includes adjusting the fuel injection amount to equal the minimum fuel injection amount when the target fuel injection amount is less than the minimum fuel injection amount.

5. The method of claim 1, further comprising injecting the adjusted fuel injection amount when the target fuel injection amount would require actuator settings that violate the predetermined constraints.

6. The method of claim 5, further comprising injecting the target fuel injection amount when the target fuel injection amount would require actuator settings that satisfy the predetermined constraints.

7. The method of claim 6, wherein the injected fuel amount is regulated with a closed-loop fuel governor controller independent of the valve actuation timing and the fuel injection timing.

8. The method of claim 1, wherein the valve actuation timing and the fuel injection timing are simultaneously regulated with a closed-loop combustion phasing controller.

9. The method of claim 1, wherein the predetermined constraints include at least one of actuator component constraints, actuator control authority constraints, and combustion performance constraints.

10. The method of claim 9, wherein the actuator component constraints include at least one of range and rate limitations of actuators controlling the valve actuation timing and the fuel injection timing.

11. The method of claim 9, wherein the actuator control authority constraints include at least one of a relative magnitude of authority and a bandwidth of actuators controlling the valve actuation timing and the fuel injection timing.

12. The method of claim 9, wherein the combustion performance constraints include at least one of limited pressure rise rates, air-to-fuel ratios, and maximum allowable emissions.

13. The method of claim 1, wherein the target fuel injection amount is determined based, at least in part, on a commanded torque.

* * * * *